Aug. 17, 1965  A. J. SCHENK ETAL  3,200,933
DISPATCHING CONTROL SYSTEM FOR CONVEYORS
Filed Dec. 1, 1961  5 Sheets-Sheet 1
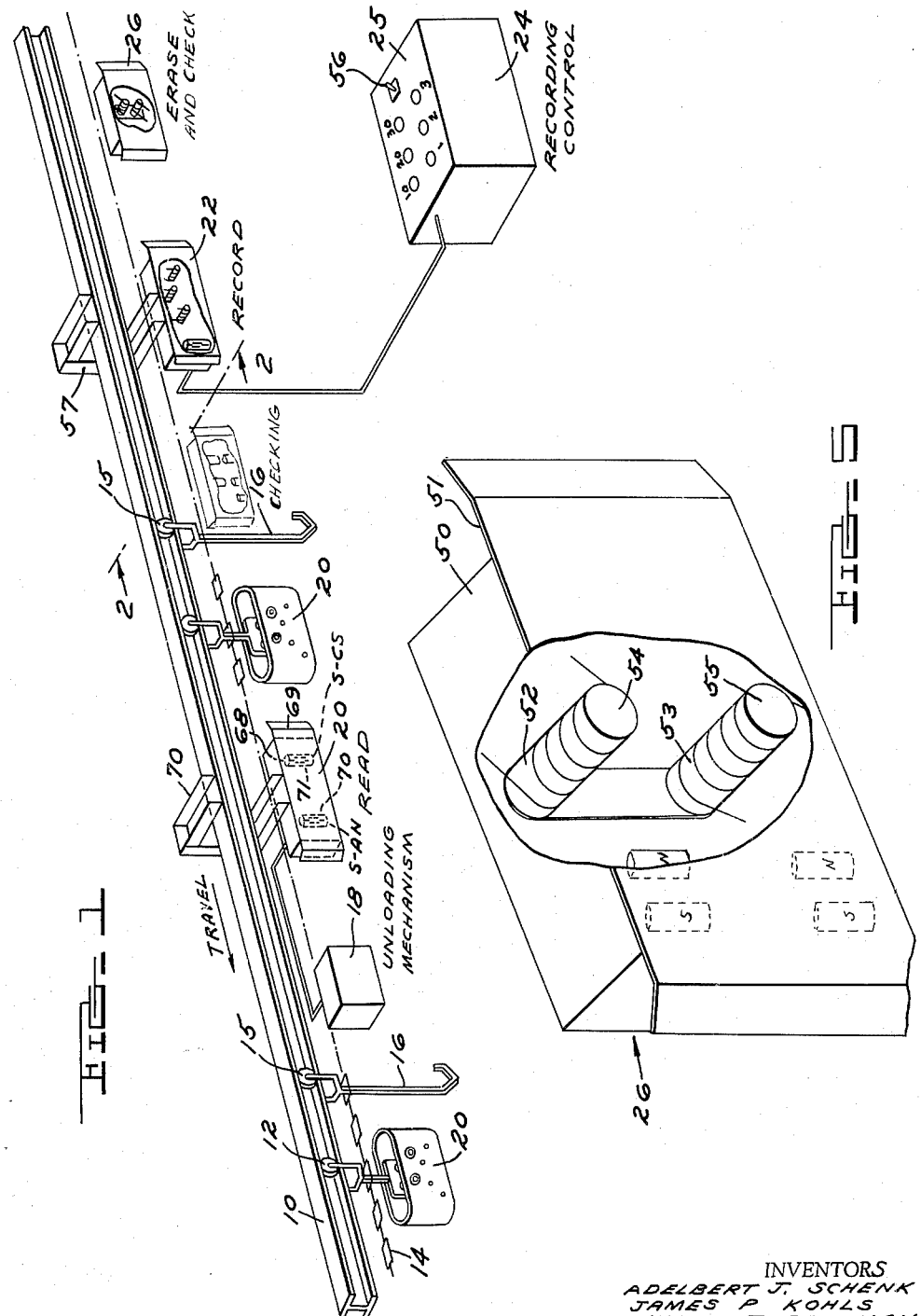
INVENTORS
ADELBERT J. SCHENK
JAMES P. KOHLS
WARD T. BRENNAN
BY
Farley Forster & Farley
ATTORNEYS

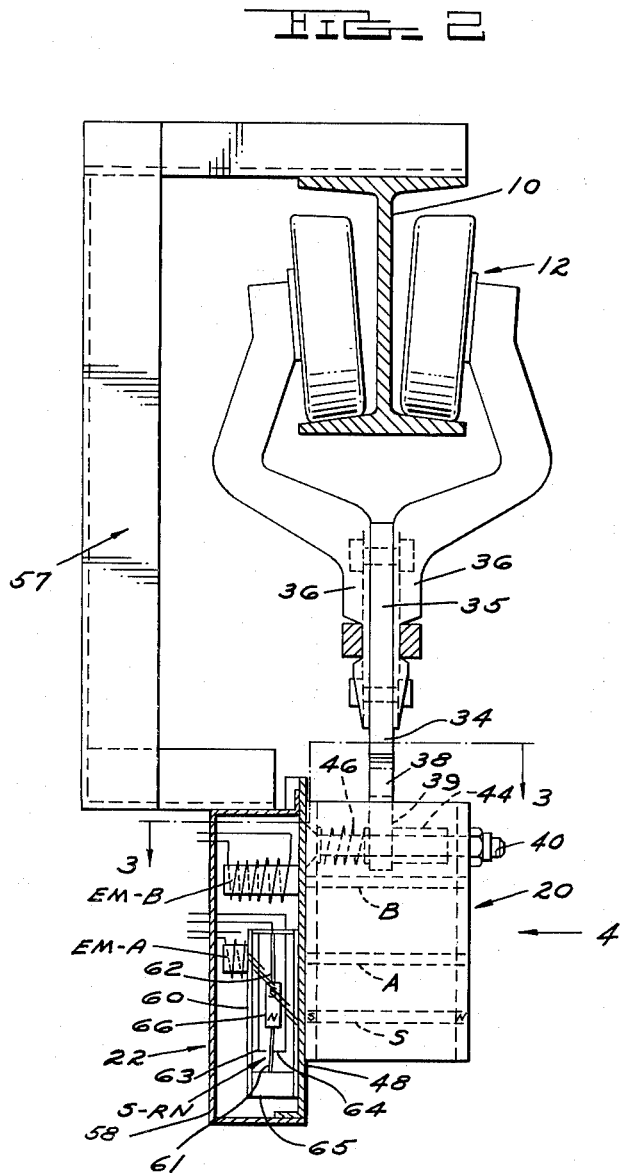

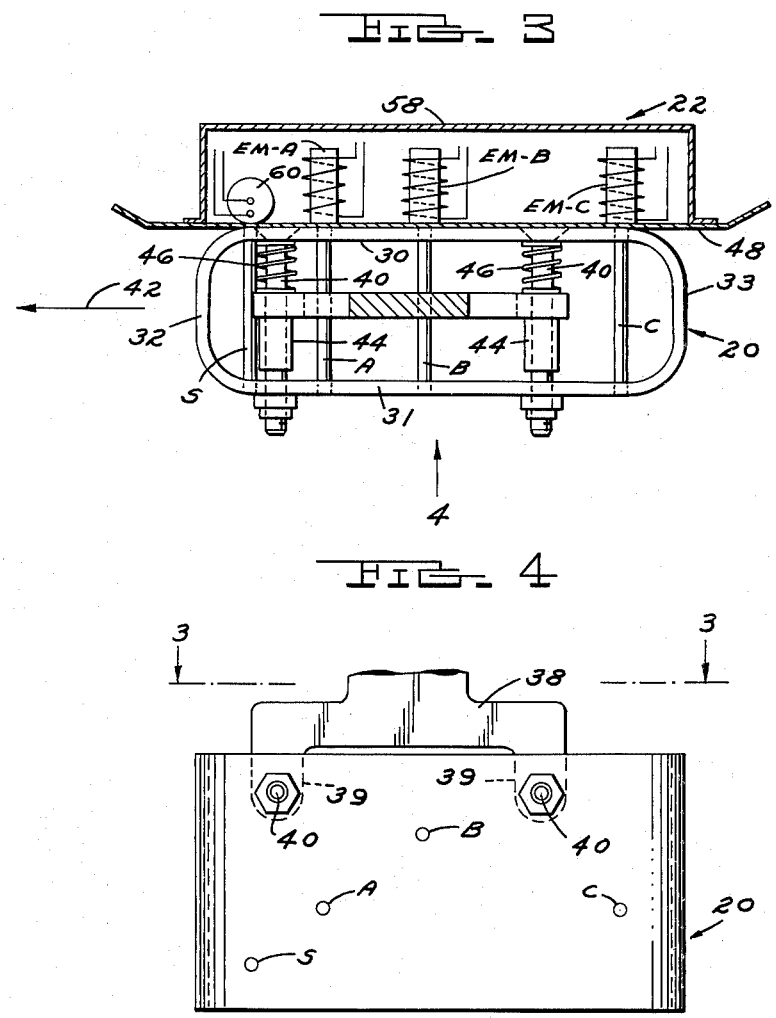

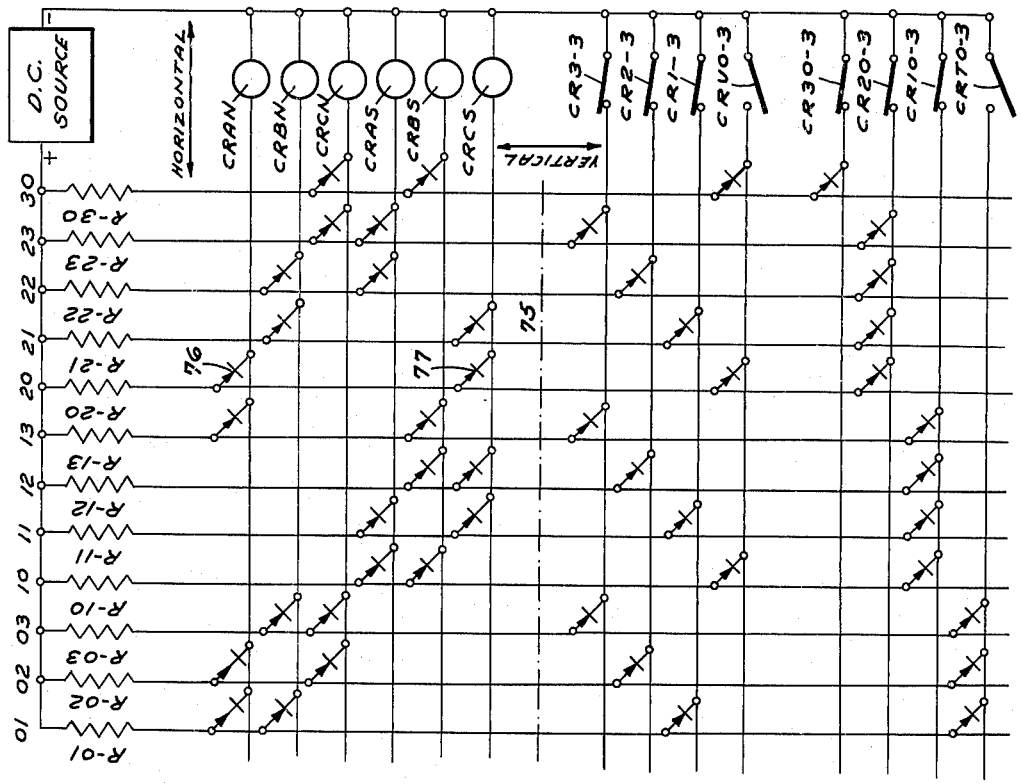
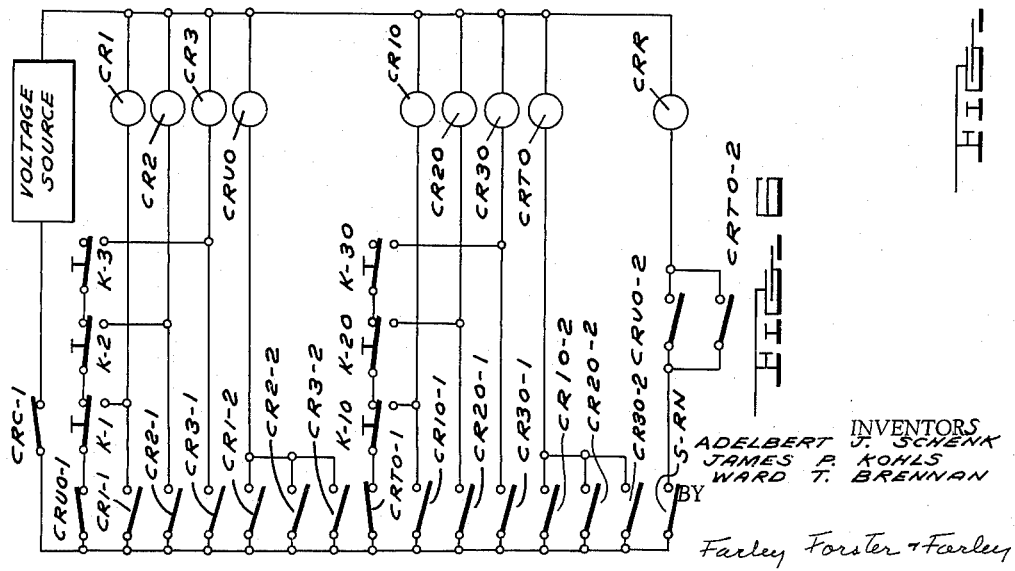

Aug. 17, 1965        A. J. SCHENK ETAL        3,200,933
          DISPATCHING CONTROL SYSTEM FOR CONVEYORS
Filed Dec. 1, 1961                        5 Sheets-Sheet 5
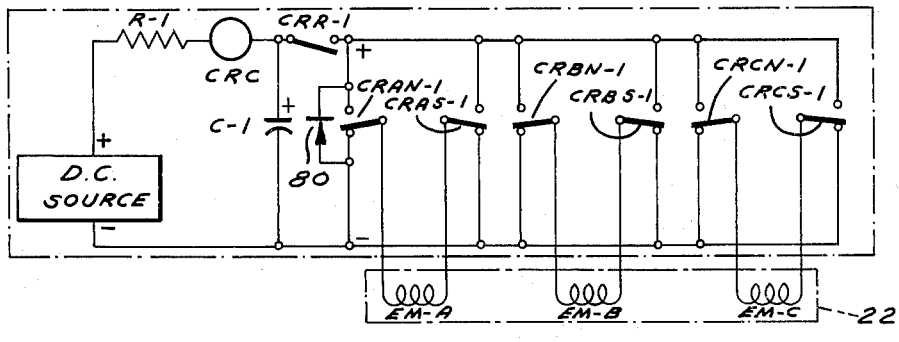
FIG. 8
| DESTINATION | MEMORY STORAGE MAGNETS | | |
|---|---|---|---|
| | A | B | C |
| 01 | N | N | O |
| 02 | N | O | N |
| 03 | O | N | N |
| 10 | S | S | O |
| 11 | S | O | S |
| 12 | O | S | S |
| 13 | N | S | O |
| 20 | N | O | S |
| 21 | O | N | S |
| 22 | S | N | O |
| 23 | S | O | N |
| 30 | O | S | N |
FIG. 9
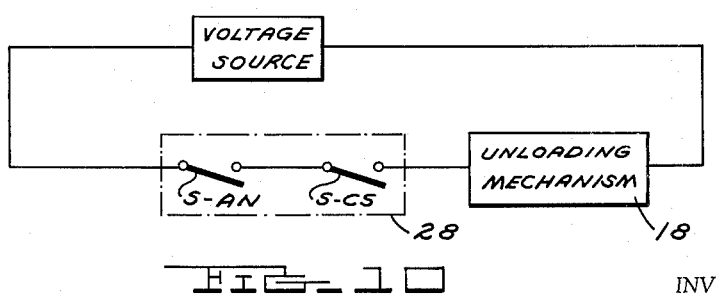
FIG. 10
INVENTORS
ADELBERT J. SCHENK
JAMES P. KOHLS
WARD T. BRENNAN
BY
Farley Forster & Farley
ATTORNEYS

United States Patent Office 3,200,933
Patented Aug. 17, 1965

3,200,933
DISPATCHING CONTROL SYSTEM FOR
CONVEYORS
Adelbert J. Schenk, Huntington Woods, James P. Kohls,
Detroit, and Ward T. Brennan, Royal Oak, Mich.,
assignors to Jervis B. Webb Company, Detroit, Mich.,
a corporation of Michigan
Filed Dec. 1, 1961, Ser. No. 156,439
17 Claims. (Cl. 198—38)

This invention relates to a system for use with a conveyor, which propels a plurality of load carrirs along a defined path of travel, for selectively dispatching such carriers to stations where some operation is to be performed with respect to the carrier or to the load thereon. Such operations may, for example, include switching the carrier to a branch line, stopping the carrier, loading, or unloading. The control system is generally of the type where magnetizable memory elements are employed for storing a dispatch code, and the invention is particularly concerned with improvements to a system of this type.

The general object of the invention is to provide a dispatch system suitable for use with any of the many types of conveyors which propel work carriers, such as overhead conveyors in which the work carrier is directly attached to the chain and trolleys of the conveyor, power and free conveyors in which the work carrier travels on a separate track and is propelled by pushers on an endless chain, or tray conveyors in which the work carrier is usually located above the propelling chain.

All such conveyors may be described as non-precision mechanisms. Dimensional variations are relatively large due to large tolerances in manufacturing and installation and to wear in service. In contrast, a magnetic memory system requires rather precise relative positioning between its various components. The present invention provides a control system which operates successfully under these conflicting conditions and requirements. Operation of the system is not affected by factors such as chain stretch, variations of spacing between adjacent carriers, variations of conveyor speed, or variations from a desired path of travel; moreover, the various components of the present system can be readily employed to provide a dispatching control for almost any type of conveyor merely by suitable design changes in the mounting of these components as required by variations in the structure between different conveyors.

The system of the present invention may be generally described as comprising a signal carrier which is attached by suitable means to a moving element of a conveyor, the signal carrier being provided with one or more magnetizable memory elements mounted thereon. Ordinarily a plurality of magnetizable memory elements will be employed and in this case the memory elements are arranged in a specific pattern in which the elements are spaced from each other in a direction longitudinally of the path of travel or transversely thereto, or both. The signal carrier is also provided with a permanetly magnetized signal element mounted on the signal carrier in spaced relation to the memory element or pattern of memory elements so that the signal element follows a different line of travel. Preferably the signal carrier is connected to the conveyor by means which permit relative movement between the signal carrier and conveyor in a direction transverse to the path of conveyor travel.

The remaining components of the system consist of an erasing element, a recording station and a reading station, these components being arranged along the path of travel of the signal carrier so as to be passed thereby in the order named during movement of the conveyor. The erasing element includes a means by which all memory elements on the signal carrier can be de-magnetized. The recording station is provided with a number of recording heads which correspond to the number of memory elements on the signal carrier and which are arranged in the same relative position or pattern; and with a sensing device which is mounted in the same spaced relation to the recording heads as is the signal element to the pattern of memory elements. Controls and circuits associated with the recording station enable a certain combination of recording heads to be activated, or placed in a ready condition, in accordance with a selected dispatch code, and upon detection of the signal element of a signal carrier by the sensing device of the recording station, the activated recording heads are energized, thereby simultaneously magnetizing a corresponding combination of memory elements with the polarity of the dispatch code selected.

A reading station includes a memory element detector for each memory element of the signal carrier utilized in the code for that particular station. These detectors are mounted in the same relative position as are the memory elements they are to detect, each detector being responsive to one magnetic polarity of its respective memory element. A preferred form of detector consists of a normally open switch having a small permanent magnet supporting the movable contact. Where a plurality of detectors are employed at a reading station, their open contacts are connected in series, and becaues of the relative positioning between detectors, the contacts are simultaneously closed only when a signal carrier having the code of that station impressed on its memory element passes the switches. The detectors are employed as components of suitable circuits, known to those skilled in this art, for actuating whatever device may be employed to perform the desired operation at a particular station.

Other features and advantages of the invention will be discussed in the following description of the preferred representative embodiment thereof, disclosed in the accompanying drawings which consist of the following views:

FIGURE 1, a perspective schematic view showing the various components of this system as employed in connection with an overhead trolley conveyor;

FIGURE 2, a sectional elevation taken as indicated by the line 2—2 of FIG. 1 but showing a signal carrier passing the recording station;

FIGURE 3, a sectional plan view taken as indicated by the line 3—3 of FIGS. 2 and 4;

FIGURE 4, a side elevation of the signal carrier taken as indicated by the arrows 4 on FIGS. 2 and 3;

FIGURE 5, a perspective view, partly schematic, showing the erase station;

FIGURES 6, 7 and 8, diagrams showing the circuitry of the recording station;

FIGURE 9, a chart showing the magnetic polarity of the memory magnets in terms of a representative destination code; and FIGURE 10, a schematic circuit diagram illustrating the operation of the reading station.

Referring to FIG. 1, the components of an overhead trolley conveyor system are illustrated, including a track 10, trolleys 12 supported thereby and connected to a propelling chain 14, with some of the trolleys 15 being equipped with load carriers 16. A controlled device 18 is schematically illustrated as being located at a station along the path of conveyor travel. This device forms no part of the present invention, but for the purposes of this description it may be assumed to consist of suitable mechanism for removing a load from a carrier 16, and capable of being actuated by an electrical signal derived from the control system of the invention.

The components of the system consist of the following:

(1) Signal carriers 20 which are each secured to a moving element of the conveyor structure in association with a load carrier 16. In this instance, each signal carrier 20 is secured to a trolley 12 immediately in advance of a trolley 15 which supports a load carrier 16. In the case of a power and free conveyor where load carriers can be diverted onto a branch line, a signal carrier would be connected directly to the load carrier so as to at all times travel therewith. In other types of conveyor installations, the signal carrier could be connected to any other suitable movable element of the conveyor structure.

(2) A recording station 22 at which a destination code signal is impressed upon the signal carrier 20 by operation of a recording control 24 including a keyboard 25.

(3) An erase element 26 which preferably is located immediately in advance of the recording station for removing previously stored information from a signal carrier unless the previous information must be retained, as for example when a loaded carrier must be recirculated to the same destination.

(4) A read station 28 where a magnetic code signal on a signal carrier is sensed and the control device 18 operated in response to the passage of the signal carrier bearing the code for that particular station.

These various components will now be described in detail:

Signal Carrier (FIGS. 2-4)

In the form of construction illustrated, the signal carrier 20 is made as a shell of non-magnetic material having sidewalls 30 and 31 and rounded ends 32 and 33. This carrier is connected to the conveyor by means which include a hanger bracket 34 whose upper end 35 is secured between the yokes 36 of the conveyor bracket 12, and whose lower end 38 is provided with a pair of longitudinally spaced depending projections 39. A pair of bolts 40 are mounted transversely across the signal carrier 20 and each slidably extends through a hole in one of the projections 39 of the hanger bracket. This connection permits relative movement between the signal carrier and the hanger bracket 34 in a direction transverse to the path of conveyor movement, indicated by the arrow 42 on FIG. 3, from a normal position defined by means comprising a spacer sleeve 44 mounted on each of the bolts 40 between one side of the hanger bracket and the sidewall 31 of the carrier, and a spring 46 mounted on each of the bolts 40 between the other side of the hanger bracket and opposite side 30 of the carrier. Springs 46 normally urge the bracket 34 into engagement with the spacers 44 and the spacers into engagement with the carrier sidewall 31, thereby positioning the bracket 34 relative to the longitudinal centerline of the carrier. In FIGS. 2 and 3, the carrier 20 is shown passing the recording station 22, the carrier side face 30—which is a plane surface extending parallel to the path of conveyor movement—having engaged the guide face 48 of the recording station, resulting in relative movement between the carrier 20 and hanger bracket 34 so that any variation in track of the carrier is compensated for and surface to surface contact is ensured between the face 30 of the carrier and the guide plate 48 of the recording station without the necessity of providing a pair of guide plates between which the carrier would pass, although such a construction can be employed in which case the spacers 44 and springs 46 would not be necessary.

A plurality of magnetizable memory elements A, B and C are mounted between the sidewalls 30 and 31 of the carrier 20 in spaced relationship to form a specific pattern which would be the same for all carriers of a particular installation. In the present instance, memory elements A and C are mounted in longitudinally spaced relation on the same line of travel, and the element B is mounted so as to travel in a separate channel or path. A signal element S, which is a permanent magnet, is also mounted between the sidewalls of the carrier in spaced relation to the pattern of memory elements so as to travel on a distinct channel or path. Side 30 of the signal carrier 20 is the working face thereof, and the memory and signal elements are each mounted so that one end thereof extends through this sidewall and is flush with the outer face.

Erase Station (FIGS. 1-5)

This components consists simply in a suitable casing 50, having a guide plate 51, in which a pair of electro-magnets 52 and 53 are mounted with the end 54 of the electro-magnet 52 being placed in alignment with the path of travel of the memory element B of each signal carrier, and with the end 55 of the electro-magnet 53 being placed in line with the path of travel of memory elements A and C. Normally the electro-magnets 52 and 53 are constantly excited from an alternating current source (not shown), but this excitation may be controlled by any suitable means such as a switch 56 mounted on the control panel 24 so that when desired, memory elements of a signal carrier will not be erased. The erasing unit is suspended from the conveyor rail 10 by suitable structure (not shown) but which is similar to that shown for the recording unit 22 in FIG. 2.

Recording unit (FIGS. 1-3)

The recording unit 22 is suspended from the rail 10 by a bracket 57 and consists of a suitable case 58, including the guide plate 48, in which three electro-magnets EM-A, EM-B and EM-C are mounted in a pattern which corresponds exactly to the pattern of the memory elements A, B and C of the signal carrier 20. A sensing unit 60, best shown in FIG. 2, is also mounted within the casing 50. This unit is an encased switch S-RN, having a movable contact 61 suspended on a spring 62 between a pair of stationary contacts 63 and 64, contact 63 being employed merely as a stop. One end of the movable contact 61 extends into a pool of mercury 65 at the bottom of the casing so that all contacts are wetted with mercury through capillary action. A permanent magnet 66 is secured to the spring 62 so as to be integral with the moving switch contact 61 and the sensing unit is mounted so that one of the poles of this magnet 66 lies adjacent to the path of travel of the signal element S and so spaced from the electro-magnets that the electro-magnets and memory elements will be aligned when the switch S-RN is first operated by the signal element S. Movable contact 61 is normally positioned by action of the spring 62 against the stationary contact 63 and the magnet 66 is mounted so that its north pole is adjacent to the passing south pole of the signal elements so that the passage of the signal element results in the switch contact 61 moving into engagement with stationary contact 64 as shown in FIG. 2. Normally the electro-magnets of the recording unit are de-energized.

Reading station (FIG. 1)

This unit also consists of a suitable case 68 including a guide plate 69 which is suspended adjacent to the path of travel of the signal carriers 20 by a suitable bracket 70. Mounted within the case 68 are a suitable number of detectors each of which is similar to the sensing element 60 just described mounted in the recording unit 22. The number and arrangement of these detectors will depend somewhat on the type of destination code employed for a particular control system. In the present instance two detectors are used at each reading station as illustrated by the units 70 and 71 at the reading station 28 of FIG. 1, each detector being responsive to the position and polarity of one memory element on a signal carrier. The relative positions of the units 70 and 71, for this particular station, are the same as that of the memory elements A and C of signal carrier 20 and the permanent magnet on the movable switch contact of unit 70 is arranged so as to detect the passage of memory element A whose adjacent or sensed end carries north polarity. Unit 71 is arranged to detect the passage of memory element C, having its sensed end magnetized with south polarity. Consequently, the switch in the detector unit 70 is designated S–AN and the switch in detector unit 71 is designated as S–CS.

The arrangement of detector units at other reading stations in the system will be apparent from a study of the destination code employed on the memory elements of the signal carriers, shown in the table FIG. 9. The reading station 28 selected for illustration is that of destination 20 where the detector units are arranged to detect the passage of memory units A and C carrying north and south polarities respectively. Memory unit B is unpolarized. Detector units at any other reading station will be arranged in the position and polarity to detect the passage of memory units having the polarities shown in the code for that destination.

*Destination coding (FIG. 9)*

In the example given, the destination coding arrangement is one wherein a total of 12 destinations are obtained from the combination of the three memory elements A, B and C, any two of which are magnetized with certain polarities for each destination. The number of destinations can of course be extended to any degree desired by increasing the number of memory elements, or the number magnetized at one time, or both, as long as combinations having similar relative positions are not included for more than one destination. However, the present system makes it possible to obtain a relatively large number of destinations from relatively few components, and in this connection it is particularly advantageous to operate each reading station with a lesser number of detector units than there are memory elements on signal carriers.

Twelve destinations in the present system are controlled from the keyboard 25 of the recording control 24 which is provided with three units digits keys 1, 2 and 3 and three tens digits keys 10, 20 and 30. These keys control the energization of the electro-magnets EM–A, EM–B and EM–C in the recording station 22 through the circuits shown in FIGS. 6, 7 and 8.

*Control circuits and operation (FIGS. 6, 7, 8 and 10)*

FIG. 6 schematically shows a recording type of key control circuit in which switching means in the form of relays are utilized to set up a memory system for the destination code obtained by actuating the keys and which operates to prevent more than one destination from being set up at one time. Each key of the keyboard 25, shown as K–1, K–2, etc., actuates a relay of the same number CR1, CR2, etc., and the various contacts operated by each relay are shown in their normal position and are designated by the relay number such as CR10–1, CR10–2, CR10–3, etc.

FIG. 7 schematically shows a diode matrix circuit arrangement for converting a key code destination into proper connections for energizing the magnetizing coils EM–A, EM–B and EM–C of the recording unit, schematically shown in FIG. 8, so that the memory elements will be magnetized in accordance with the table shown in FIG. 9.

These various circuits can perhaps be best understood with the aid of a description of a typical operation. As previously mentioned, the reading station 28 in FIG. 1 is that for code destination 20. In order to select this destination, the following operations take place:

(1) Key 20 (K–20, FIG. 6) is momentarily depressed, energizing relay CR20.

(2) Contact CR20–1 closes holding relay CR20 energized.

(3) Contact CR20–2 closes energizing relay CRT0 (tens only).

(4) Normally closed contact CRT0–1 opens, preventing the operation of any other tens digit key from effecting the circuit.

(5) Normally open contact CRT0–2 closes, completing a circuit to relay CRR except for the normally open switch S–RN of the sensing unit 60 in the recording station 22.

(6) Normally closed contact CR20–3, FIG. 7, is opened. In the diode matrix shown in FIG. 7, each vertical line is for one of the code destinations and is labeled accordingly. Voltage from the D.C. source is supplied to each vertical line through a resistor, and each vertical line is connected by means of two diodes through two contacts, each operated by one of the relays shown in FIG. 6, back to the voltage source, these two diodes being shown below the horizontal broken line 75. If either of these relay contacts is closed, the vertical line is shorted. If both relay contacts are open the vertical line is energized, energizing two of the six relays labeled CRAN to CRCS whose contacts control the selection and polarity of two of the magnetizing coils EM–A, EM–B and EM–C. The connections between each vertical line and the two relays are made by means of two diodes shown above the line 75. Diodes are employed for all vertical to horizontal line connections in order to block the signal from feeding from one vertical line into another.

(7) When relay contact CR20–3 is opened (normally open contact CRU0–3 (units only) remains open) vertical line 20 becomes energized, energizing relays CRAN and CRCS through the diode connections 76 and 77.

(8) Energizing relay CRAN and relay CRCS causes contacts CRAN–1 and CRCS–1 shown in FIG. 8 to be moved to the opposite position, thereby setting up connections to electro-magnet EM–A for north polarity and electro-magnet EM–C for south polarity.

(9) When the approaching signal carrier 20 reaches the recording station 22 and comes to the relative position shown in FIG. 3, the switch S–RN of the sensing unit 60 detects the passing signal element S of the carrier and is closed, thereby energizing relay CRR, FIG. 6 (A tube, controlled rectifier or other circuit closing device may be used in place of this relay CRR).

(10) Relay CRR contact CRR–1, FIG. 8, closes to discharge the storage capacitor C–1 through the magnetizing coils EM–A and EM–C. Diode 80 may be employed to suppress any inductive voltage surge from the electromagnets.

(11) The storage capacitor C–1 recharge current operates the relay CRC momentarily, opening relay contact CRC–1, FIG. 6, to release relay CR–20 and return the circuits to their original state, ready for the next destination recording operation.

Both the units and tens keys operate similar circuits and the CRU0–1 and CRT0–1 contacts electrically disable their respective key contacts when a unit or a tens key has been depressed. The relays CR–1, CR2, CR3, CR–10, CR–20 and CR–30 serve to set up a memory circuit for each key depressed so that the operator may depress the keys for any destination code at any time during the relatively long period between the passage of successive signal carriers. In other words, no precision is required between the time of the keying operation and the moment when the signal carrier is in proper relation to the magnetizing coils of the recording station to receive a destination code.

As previously explained, the memory elements of all signal carriers approaching the recording station are demagnetized normally by the erase unit 26. In case a signal carrier is approaching and it is desired to retain the destination code carried thereby, the erase unit can be deenergized by the operator actuating the switch 56, FIG. 1.

The foregoing circuit arrangement and the relation between the memory elements of the signal carrier and components of the recording station permits a destination code to be simultaneously impressed upon all memory elements required therefor by a rapidly discharged single pulse of current. This produces a high concentrated field of short duration and drives the magnetic flux of the memory elements to saturation in order that the maximum flux will be retained. This also permits the memory elements to be placed relatively close together, which is extremely desirable in conveyor work in order that the signal carrier can be dimensioned to be installed in restricted spaces available. Adjacent memory elements which are to remain unmagnetized, are not affected by the recording operation.

Capacitor C-1, FIG. 8, is employed to eliminate a sudden heavy load on the D.C. power source, while resistor R-1 and relay CRC serve to restrict the charging current of the capacitor C-1 to a moderate value. In other words, the single pulse of magnetizing current is obtained without unduly loading the voltage source at any time.

When the signal carrier magnetized with destination code 20 reaches the reading station 28, the sensing units 70 and 71 which are respectively responsive to memory units A magnetized north and C magnetized south are simultaneously operated so that the switches S-AN and S-CS in the circuit shown in FIG. 10 are simultaneously closed, operating the controlled device 18 from the voltage source.

Other of the more important features and advantages of the invention may be summarized as follows:

(1) Signal carriers permit magnetic memory elements to be attached directly to moving element of metallic conveyor structure in defined relation to load carriers.

(2) Relative transverse movement between signal carrier and conveyor permits precise positioning of memory elements relative to wayside recording and reading devices.

(3) All operations of erasing, recording and reading can be performed from one side of the signal carrier thereby simplifying the construction and mounting of the components employed for these operations and reducing the extent to which the memory elements must be positioned with precision relative to these components.

(4) Each signal carrier working surface provides a card-like area on which memory elements can be arranged in a definite pattern with both longitudinal and transverse spacing. Spacing variations can be combined with polarity variations to multiply the number of selections which can be obtained from a given number of memory elements. Also, a permanent magnet signal element can be mounted so as to travel in a distinct path where its magnetism is never affected by erase or recording operations.

(5) A prior destination code is erased from the memory elements before a new destination code is recorded. This enables destinations to be coded by employing subcombinations of memory elements—that is, a number less than the total number of memory elements on the carrier. The keying operation is thereby simplified and more importantly, the number of detectors at each reading station is reduced.

(6) A checking station can be provided to sense whether no destination code or a false destination code has been recorded on a signal carrier associated with a loaded carrier of the conveyor. Such a station would include sensing elements similar to those employed at a reading station, but arranged so as to detect each polarity in each row of memory elements and count the number of magnetized memory elements on the signal carrier. For example, in the particular destination code arrangement described in detail, the counting of two magnetized memory elements would indicate a signal within the code; any other number would be either no signal or a false one. Such a checking operation is made possible by the fact that in the present system all memory elements are erased before a signal carrier arrives at a recording station where a new destination code is to be recorded.

(7) Multiple recording stations can also be used relying on visual control by the operator of each station to prevent multiple destination codes being recorded on the same carrier, but preferably employing a checking station as mentioned above to insure no errors. If an error is detected by the checking station, the load carrier can be unloaded, thereby insuring that all loaded carriers are dispatched by a usable code.

(8) A checking device can be placed following the erasing station to insure that all memory elements of each signal carrier have been erased, that is, are non-magnetized. If any magnetized memory element is detected, the recording operation can be disable, or preferably the conveyor can be stopped, and a warning signal activated.

While preferred embodiments have been described above in detail, it will be understood that numerous modifications might be resorted to without departing from the scope of our invention as defined in the following claims.

We claim:

1. A dispatch system for a conveyor which propels a plurality of load carriers along a defined path of travel, said system comprising:
    (a) a plurality of signal carriers;
    (b) attaching means for connecting each of said signal carriers to a moving element of the conveyor in defined relation to one of the load carriers thereof;
    (c) each signal carrier being constructed of non-magnetic material and having a plurality of magnetizable memory elements mounted thereon in a specific pattern, and a permanent magnet signal element mounted on the signal carrier in spaced relation to said pattern so as to travel on a line transversely spaced therefrom with respect to the direction of travel of said conveyor;
    (d) an erasing element having means for demagnetizing all memory elements on said signal carrier;
    (e) a recording station located adjacent the path of travel of said signal carrier subsequent to said erasing element with respect to the direction of movement of the conveyor, said recording station including a number of recording heads corresponding to the number of memory elements on the signal carrier and arranged in the same pattern, a sensing device responsive to the presence of said signal element and mounted with respect to said recording heads in the same spaced relation as is said signal element to said memory elements, key and circuit means for potentially activating certain recording heads in accordance with a selected destination of a dispatch code, said circuit means including means for simultaneously energizing said certain recording heads by a rapidly discharged current pulse in response to the passage of said signal element by the said sensing device whereby a memory element corresponding in position to each of said certain recording heads is magnetized with the polarity for said selected destination;
    (f) and a reading station mounted adjacent to the path of carrier travel at each dispatch code destination, each reading station having a detector responsive to the polarity of each magnetized memory element of said signal carrier utilized in the dispatch code for that destination and said memory element detectors being mounted in the same spaced relation to any other detector as are the magnetized memory elements mounted relative to each other on the signal carrier.

2. A dispatch system according to claim 1 further characterized by said attaching means including means permitting relative movement between said signal carrier and the moving element of the conveyor to which it is connected in a direction transverse to the path of conveyor travel.

3. A conveyer dispatch system according to claim 2 further characterized by means resiliently urging said signal carrier to one normal position relative to said moving conveyor element to which it is attached.

4. A conveyor dispatch system according to claim 1 further characterized by the pattern in which said magnetizable memory elements are mounted on said signal carrier being one in which at least one of said memory elements is spaced in a direction transverse to the path of conveyor travel from at least one other of said memory elements.

5. A conveyor dispatch system according to claim 1 wherein said erasing, recording and reading components are each mounted adjacent the same side of conveyor travel, said signal carrier attaching means including means permitting relative movement between said signal carrier and said conveyor element to which it is attached, and guide means associated with each of said components for engagement by said signal carrier to establish the relative position between said signal carrier and each of said components.

6. A conveyor dispatch system according to claim 1 further characterized by the pattern in which said magnetizable memory elements are mounted on said signal carrier being one in which at least one of said memory elements is spaced in a direction transverse to the path of conveyor travel from at least one other of said memory elements, and in which at least a third memory element is spaced in a direction longitudinally of the path of conveyor travel from another of said memory elements.

7. A dispatch system according to claim 1 wherein said dispatch code is such that the number of memory elements magnetized at said recording station for each code destination is less than the total number of magnetizable memory elements mounted on said signal carrier.

8. A conveyor dispatch system according to claim 1 further characterized by said circuit means including, a contact operated by each key, switching means energizable by each of said key contacts, a recording head circuit including a source of energizing current and means for controlling the direction of such energizing current through each of said recording heads, and a diode matrix connecting said switching means and said recording head energizing current controlling means.

9. A conveyor dispatch system according to claim 8 further characterized by said circuit means including means for holding said switching means energized, and means for de-energizing said circuit means in response to the energizing of said certain recording heads.

10. A conveyor dispatch system according to claim 9 further characterized by said recording head circuit including a capacitor between said source of energizing current and said recording heads, a switching device actuated by said sensing device between said capacitor and recording heads, and means responsive to a flow of current from said current source to said capacitor for de-energizing said circuit means.

11. A dispatch system according to claim 1 wherein said circuit means includes, a contact operated by each of said keys, switching means energizable by each of said key contacts, and means responsive to the energization of said key contact switching means for disabling other key contacts.

12. A dispatch system according to claim 1 further characterized by the provision of a checking device following said erasing element, said checking device including means for detecting any magnetized memory element of a signal carrier.

13. A signal carrier for use in a dispatch system of the type described for a conveyor, comprising a non-magnetic member having at least one plane outer working surface, a plurality of magnetizable memory elements carried by said member with one end of each of said elements substantially flush with said surface and arranged in a specific pattern, a permanent magnet signal element carried by said member with one end thereof also substantially flush with said surface and located in spaced relation to said pattern, a hanger bracket for said signal carrier, means whereby one end of said bracket may be secured to said conveyor, and means for connecting said bracket to said member, said connecting means permitting relative movement between said bracket and member in a direction normal to said surface.

14. A signal carrier according to claim 13 wherein said connecting means includes a pair of connectors carried by said member and slidably engaging said bracket, said connectors extending in a direction normal to said surface.

15. A signal carrier according to claim 13 further characterized by said connecting means including means normally urging said member to one position relative to said bracket.

16. A signal carrier according to claim 13 further characterized by means normally urging said member to one position relative to said bracket and comprising spacer elements carried by said connecting members and springing means interposed between said member and bracket.

17. A dispatching control of the type wherein a load carrier of a conveyor can be identified at a destination station by a code impressed at a recording station on one or more magnetizable memory elements associated with the load carrier; characterized in that a plurality of the magnetizable memory elements and a permanent magnet signal element are mounted on a signal carrier of non-magnetic material, the plurality of memory elements being arranged in a specific pattern and the signal element being mounted in spaced relation to such pattern so as to travel on a line transversely spaced therefrom; attaching means for connecting the signal carrier to the conveyor in defined relation to the load carrier, and a recording station located adjacent and to one side of the path of travel of said signal carrier, said recording station including a number of recording heads corresponding to the number of memory elements on the signal carrrier and arranged in the same pattern, a sensing device responsive to the presence of said signal element and mounted with respect to said recording heads in the same spaced relation as is said signal element to said memory elements, key means for selecting a destination code, memory circuit means operable in response to actuation of the key means for establishing connections to certain recording heads in accordance with the destination code selected, and circuit means for simultaneously energizing said certain recording heads by a rapidly discharged current pulse in response to the passage of said signal element by the said sensing device.

References Cited by the Examiner

UNITED STATES PATENTS

| | | | |
|---|---|---|---|
| 2,857,059 | 10/58 | Goerlich et al. | 198—38 X |
| 2,877,718 | 3/59 | Mittag. | |
| 2,900,146 | 8/59 | Hafner et al. | |
| 2,936,556 | 5/60 | Gibson et al. | 198—38 X |
| 3,074,353 | 1/63 | Devonshire et al. | |
| 3,075,653 | 1/63 | Wales et al. | 198—38 X |
| 3,087,598 | 4/63 | Clore | 198—38 |
| 3,100,040 | 8/63 | Kleist | 104—88 X |
| 3,117,754 | 1/64 | Morganstern | 104—88 X |

SAMUEL F. COLEMAN, *Primary Examiner.*

WILLIAM B. LA BORDE, *Examiner.*